(12) United States Patent
Cisneros

(10) Patent No.: US 11,724,666 B2
(45) Date of Patent: Aug. 15, 2023

(54) SYSTEM AND METHOD FOR REMOTELY MONITORING VEHICLE ACCESS (71) Applicant: Honda Motor Co., Ltd., Tokyo (JP)

(72) Inventor: Luis Antonio Cisneros, Paramount, CA (US)

(73) Assignee: Honda Motor Co., Ltd., Tokyo (JP)

( * ) Notice: Subject to any disclaimer, the term of this patent is extended or adjusted under 35 U.S.C. 154(b) by 499 days.

(21) Appl. No.: 16/823,243

(22) Filed: Mar. 18, 2020

(65) Prior Publication Data
US 2021/0291786 A1 Sep. 23, 2021

(51) Int. Cl.
*B60R 25/31* (2013.01)
*B60R 25/24* (2013.01)
*B60R 25/34* (2013.01)
*B60R 25/10* (2013.01)
*B60R 25/01* (2013.01)

(52) U.S. Cl.
CPC ............ *B60R 25/24* (2013.01); *B60R 25/01* (2013.01); *B60R 25/10* (2013.01); *B60R 25/31* (2013.01); *B60R 25/34* (2013.01)

(58) Field of Classification Search
CPC ......... B60R 25/24; B60R 25/01; B60R 25/10; B60R 25/31; B60R 25/34
See application file for complete search history.

(56) References Cited

U.S. PATENT DOCUMENTS

| | | | |
|---|---|---|---|
| 6,922,622 B2 | 7/2005 | Dulin et al. | |
| 7,170,401 B1 | 1/2007 | Cole | |
| 7,242,282 B2 * | 7/2007 | Pinckney, Sr. | B60R 25/104 340/5.72 |
| 7,683,764 B2 * | 3/2010 | Kurpinski | B60R 25/2036 340/426.36 |
| 7,714,737 B1 | 5/2010 | Morningstar | |
| 8,620,490 B2 * | 12/2013 | Lickfelt | B60R 25/00 701/2 |
| 8,836,491 B2 * | 9/2014 | Rao | B60H 1/00978 340/426.26 |
| 9,437,064 B1 * | 9/2016 | Ghabra | G07C 9/00658 |
| 10,023,116 B2 | 7/2018 | Rovinsky | |
| 10,472,867 B2 | 11/2019 | Lange et al. | |
| 2004/0085195 A1 * | 5/2004 | McKibbon | B60R 25/33 340/426.36 |
| 2007/0216517 A1 * | 9/2007 | Kurpinski | B60R 25/245 340/8.1 |
| 2011/0267186 A1 * | 11/2011 | Rao | B60H 1/00978 348/E5.09 |
| 2014/0316607 A1 * | 10/2014 | Le | B60N 2/0248 701/1 |
| 2014/0316660 A1 * | 10/2014 | Le | B60N 2/002 701/49 |

(Continued)

FOREIGN PATENT DOCUMENTS

| | | |
|---|---|---|
| CN | 108382352 A | 8/2018 |
| CN | 110288803 A | 9/2019 |
| WO | 2017100883 A1 | 6/2017 |

*Primary Examiner* — Nay Tun
(74) *Attorney, Agent, or Firm* — Stinson LLP (57) ABSTRACT

Vehicle occupant monitoring systems and methods detect a door of a vehicle being closed. Upon detecting the door being closed, a key fob state of the vehicle and an occupant state of the vehicle are determined. It is determined whether to present at least one type of alert based on the key fob state and the occupant state.

20 Claims, 6 Drawing Sheets

(56) References Cited

U.S. PATENT DOCUMENTS

| | | | |
|---|---|---|---|
| 2016/0225203 A1* | 8/2016 | Asmar | G07C 9/00309 |
| 2017/0041816 A1 | 2/2017 | Cho et al. | |
| 2017/0101111 A1* | 4/2017 | Fung | B60K 35/00 |
| 2017/0166086 A1* | 6/2017 | D'Addetta | B60R 21/01512 |
| 2018/0162322 A1* | 6/2018 | Boehm | G06V 20/59 |
| 2019/0230213 A1* | 7/2019 | Konchan | H04M 1/72463 |
| 2019/0346531 A1* | 11/2019 | Apostolos | H04W 4/025 |
| 2020/0086785 A1* | 3/2020 | Lee | G08B 21/22 |
| 2020/0189462 A1* | 6/2020 | Shimizu | B60Q 9/00 |
| 2020/0383580 A1* | 12/2020 | Shouldice | B60W 50/14 |

* cited by examiner

SYSTEM AND METHOD FOR REMOTELY MONITORING VEHICLE ACCESS

BACKGROUND

One or more people may enter a vehicle when its owner or operator is not in or near the vehicle. For example, a door of the vehicle may be unlocked or left open. In some cases, an occupant of the vehicle may not be able to communicate their presence to the owner or operator. For example, the occupant may be in a state of sleep, a child, or a pet. In such cases, the owner or operator of the vehicle may not be aware of the presence of one or more occupants of the vehicle.

SUMMARY

Examples of this disclosure enable vehicle access to be remotely monitored. In one aspect, a computer-implemented method is provided for remotely monitoring access of a vehicle. The method may include detecting a door of the vehicle being closed, determining a key fob state of the vehicle and an occupant state of the vehicle upon detecting the door being closed, and determining whether to present at least one type of alert based on the key fob state and the occupant state.

In another aspect, a vehicle occupant monitor system is provided. The vehicle occupant monitor system may include a plurality of sensors including a door sensor, a key fob sensor, and an occupant sensor, a processor, and a memory storing instructions that, when executed by the processor, cause the processor to perform a plurality of operations including detecting a door signal associated with the door sensor, communicating with the key fob sensor to determine a key fob state of the vehicle upon detecting the door signal, communicating with the occupant sensor to determine an occupant state of the vehicle, and determining whether to present at least one type of alert based on the key fob state and the occupant state. The door signal may be indicative of a door of a vehicle being closed.

In yet another aspect, a non-transitory computer readable storage medium is provided. The non-transitory computer readable storage medium stores instructions that, when executed by a computer, cause the computer to perform a plurality of operations that may include detecting a door of a vehicle being closed, determining a key fob state of the vehicle and an occupant state of the vehicle upon detecting the door being closed, and determining whether to present at least one type of alert based on the key fob state and the occupant state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The novel features believed to be characteristic of the disclosure are set forth in the appended claims. The drawings are not necessarily drawn to scale and certain drawings may be shown in exaggerated or generalized form in the interest of clarity and conciseness. The disclosure itself, however, will be best understood by reference to the following Detailed Description when read in conjunction with the accompanying drawings, wherein:

Like parts are marked throughout the drawings, as well as throughout the Detailed Disclosure, with the same numerals. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The subject matter described herein relates to monitoring systems and, more particularly, to vehicle occupant monitoring. Examples of the disclosure enable an owner or operator (e.g., an adult) to remotely monitor one or more vehicles. Examples described herein include a plurality of sensors, including a door sensor, a key fob sensor, and one or more occupant sensors. The door sensor may be used to detect when one or more doors are opened or closed. In some examples, the key fob sensor may be used to determine a key fob state of the vehicle, and the occupant sensors may be used to determine an occupant state of the vehicle. Based on the key fob state and/or occupant state, it may be determined whether to present at least one type of alert. The alert may be transmitted, for example, to a mobile device associated with the owner or operator of the vehicle. In this manner, an owner or operator may be notified when one or more unauthorized users (e.g., children) have gained unauthorized entry into a vehicle. Examples described herein are configured to operate whether or not an anti-theft system is armed.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be or include, for example, magnetic tape, a floppy disk, a hard disk, a compact disc (CD), a digital versatile disc (DVD), a memory card, and/or a flash drive. The disk can store an operating system that controls or allocates resources of a computing device.

A "database", as used herein can refer to table, a set of tables, and a set of data stores and/or methods for accessing and/or manipulating those data stores. Some databases can be incorporated with a disk as defined above.

A "memory", as used herein can include non-volatile memory and/or volatile memory. Non-volatile memory can include, for example, read-only memory (ROM), programmable ROM (PROM), erasable PROM (EPROM), electrically erasable PROM (EEPROM), solid-state drives, and/or disks. Volatile memory can include, for example, random-access memory (RAM), static RAM (SRAM), dynamic RAM (DRAM), synchronous DRAM (SDRAM), and/or double data rate SDRAM (DDR SDRAM). The memory can store an operating system that controls or allocates resources of a computing device.

A "module" or "unit", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, unit, method, and/or system. A module or unit may also include logic, a software controlled microprocessor, a discrete logic circuit, an analog circuit, a digital circuit, a programmed logic device, a memory device containing executing instructions, logic gates, a combination of gates, and/or other circuit components. Multiple modules and/or units may be combined into one module or unit and single modules or units may be distributed among multiple modules and/or units.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various units to execute various functions.

A "vehicle", as used herein, refers to any moving vehicle that is capable of carrying one or more human occupants and is powered by any form of energy. The term "vehicle" includes, but is not limited to: cars, trucks, vans, minivans, sport utility vehicles (SUVs), motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with predetermined paths or free-moving vehicles A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage. In other cases, the value or level of X could be a value in a range. In still other cases, the value or level of X may not be a numerical value, but could be associated with a given discrete state, such as "not X", "slightly x", "x", "very x" and "extremely x."

I. System Overview

Figure 1:
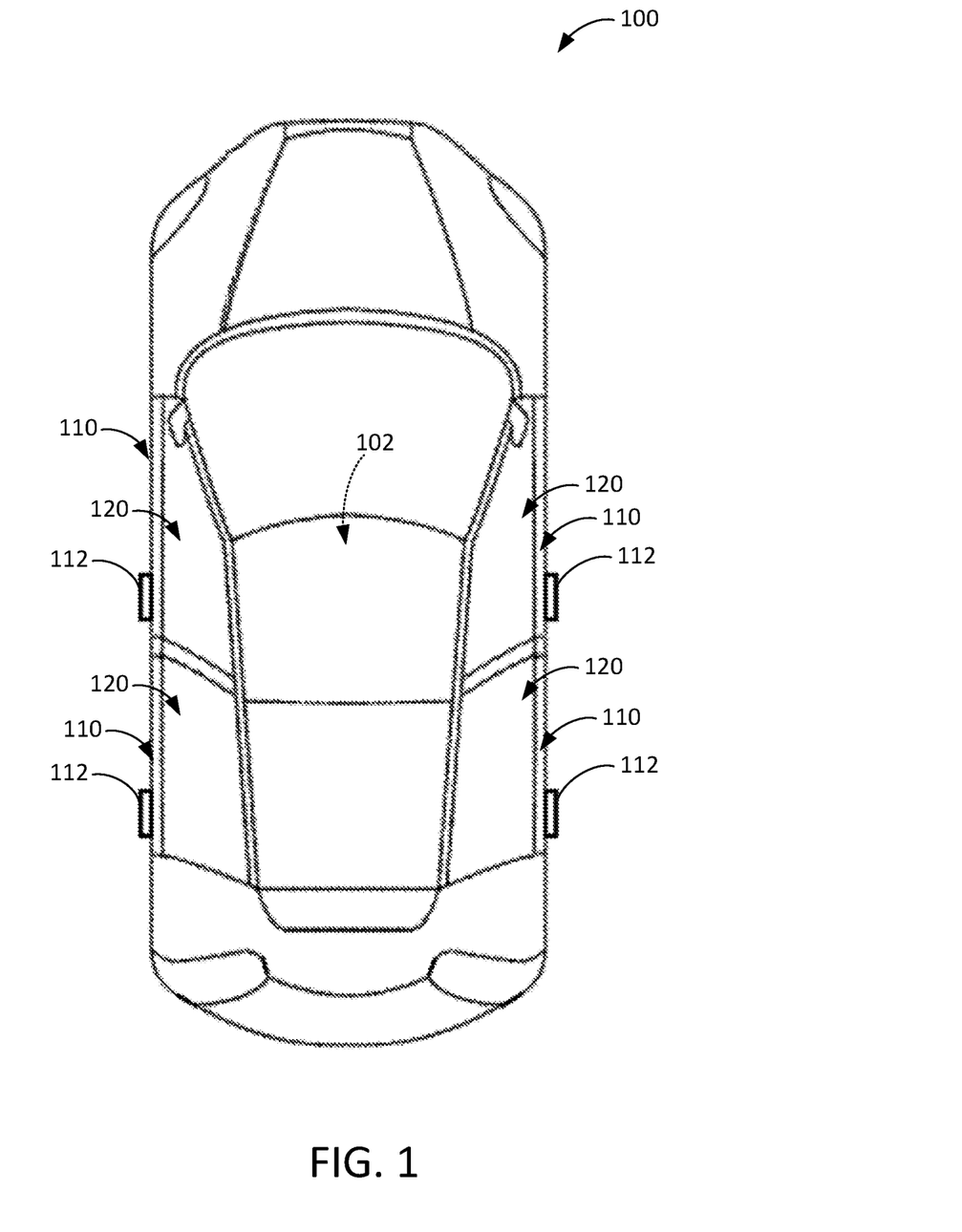
FIG. 1 is a schematic view of an operating environment of a vehicle occupant monitor (VOM) system for providing vehicle occupant monitoring of a vehicle according to some examples of the present disclosure.

Referring now to the drawings, which are provided for purposes of illustrating one or more examples and not for purposes of limiting the same, with reference to FIG. 1, an example vehicle 100 includes an interior space or cabin 102 configured to accommodate one or more occupants. The vehicle 100 includes one or more doors 110 that allow the occupants to enter into and leave from the cabin 102. Example doors may include a driver side front door, a passenger side front door, one or more rear doors, and/or a tailgate (not shown).

In some examples, the doors 110 include one or more door handles 112 for opening and/or closing each of the respective doors 110. Door handles 112 disposed outside the cabin 102 (e.g., "exterior door handles") may be used to allow one or more occupants-to-be to access or enter the cabin 102, and door handles 112 disposed inside the cabin 102 (e.g., "interior door handles") may be used to allow one or more occupants to exit the cabin 102. In some examples, the doors 110 may be moved between a locked state and an unlocked state. While the cabin 102 is described and shown to include four doors 110 and four door handles 112, one of ordinary skill in the art would understand and appreciate that the vehicle 100 described herein may include any quantity of doors and/or door handles in various arrangements.

In some examples, the doors 110 may include one or more windows 120. Example windows 120 may include a driver side window, a passenger side window, and/or one or more rear windows. Additionally, the vehicle 100 may include a sunroof (not shown) and/or a moonroof (not shown). In some examples, the windows 120 may be selectively moved between an open state and a closed state. The windows 120 may be moved, for example, using a regulator or motor that is operatively connected to a user-operable window switch (e.g., at an interior side of a door 110).

Figure 2:
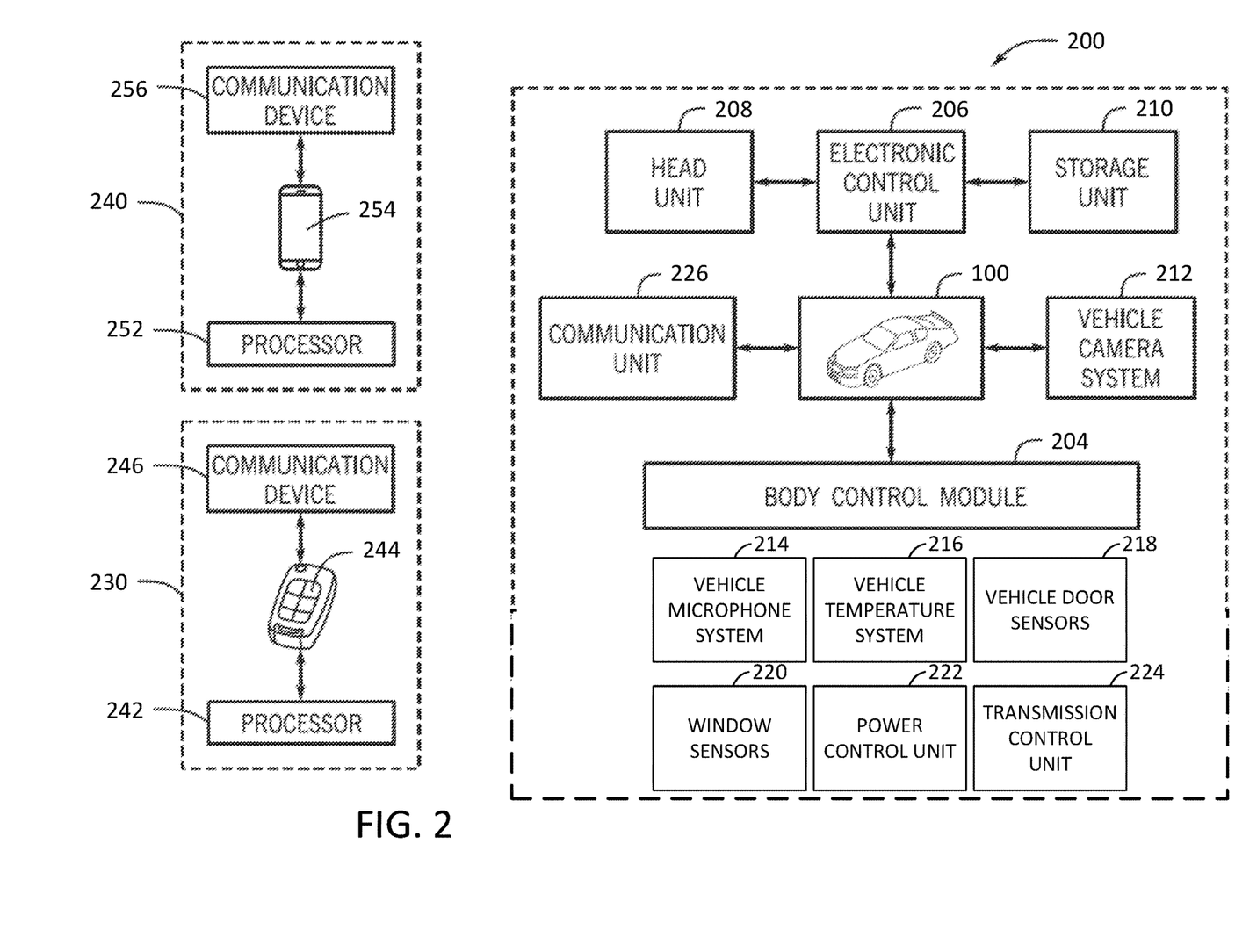
FIG. 2 is an illustrative view of an environment of the VOM system within the vehicle according to some examples of the present disclosure.

FIG. 2 shows a vehicle occupant monitor (VOM) system 200 in a vehicle 100 to notify an operator of the vehicle 100 of at least a possibility of an existence of one or more passengers (i.e., non-operator occupants) in the cabin 102 of the vehicle 100. The VOM system 200 may be utilized, for example, to provide an alert to an operator of the vehicle 100 upon determining that a door is opened and/or closed when the operator is not in or near the vehicle 100. The components of the environment, as well as the components of other systems, hardware architectures, and software architectures discussed herein, may be combined, omitted, or organized into different architectures for various examples.

Generally, the vehicle 100 includes a body control module (BCM) 204 that may be operably connected to an electronic control unit (ECU) 206 that executes instructions provided by the BCM 204. The BCM 204 and the ECU 206 may each include a processor (not shown), a memory (not shown), a disk (not shown), and an input/output (I/O) interface (not shown), which are each operably connected for computer communication via a bus (not shown). The respective I/O interface provides software and hardware to facilitate data input and output between the components of the BCM 204 and the ECU 206 and other components, networks, and data sources, of the VOM system 200.

As discussed in more detail below, the VOM system 200 may provide the operator of the vehicle 100 with one or more types of alerts. In some examples, the BCM 204 may receive one or more inputs and determine at least a possibility of an existence of one or more passengers (e.g., children, pets) in the cabin 102 based on the inputs. The BCM 204 may then accordingly provide a respective alert to the operator of the vehicle 100 based on instructions that are provided to one or more components of the vehicle 100 through the ECU 206. For example, the VOM system 200 may be activated based on a state of one or more doors 110 of the vehicle 100 and notify the operator of the vehicle 100 to check the vehicle 100 for the one or more passengers.

In addition to the BCM 204 and the ECU 206, the components of the vehicle 100 of the VOM system 200 may include, but may not be limited to, a head unit 208, a storage unit 210, a vehicle camera system 212, a vehicle microphone system 214, a vehicle temperature system 216, vehicle door sensors 218, window sensors 220, a power control unit 222, a transmission control unit 224, and a communication unit 226. The components of the VOM system 200 may be operably connected to one another via a bus controller area network (not shown) that is included as an interconnected architecture that is operably connected to the components of the VOM system 200.

The BCM 204 may be configured to communicate data to the head unit 208. The head unit 208 may include internal processing memory, an interface circuit, and bus lines for transferring data, sending commands, and communicating with the components of the VOM system 200. In some examples, the head unit 208 may execute one or more operating systems, applications, and/or interfaces that are associated to the vehicle 100. The head unit 208 may be operably connected to one or more vehicle systems and components (not shown) including, but not limited to, a vehicle infotainment system, a vehicle audio system, a vehicle door system, a vehicle light system, and/or a vehicle horn. In some examples, the head unit 208 may utilize one or more vehicle systems and components to provide the one or more alerts to the operator of the vehicle 100.

In some examples, the storage unit 210 may store one or more operating systems, applications, associated operating system data, user interfaces, and the like that are executed by the ECU 206. In some examples, the storage unit 210 may store data (e.g., executable data files) that are associated with the VOM system 200.

In some examples, the VOM system 200 may utilize the vehicle camera system 212 to capture one or more images (e.g., still images, video, etc.). The vehicle camera system 212 may include one or more cameras disposed at one or more locations in the cabin 102. The vehicle camera system 212 may be configured to detect one or more stimuli (e.g., electromagnetic waves) and output image data associated with the stimuli. Image data includes data associated with the one or more images captured by the one or more cameras of the vehicle camera system 212. The vehicle camera system 212 may transmit image data to the BCM 204 to be analyzed by the VOM system 200. For example, the BCM 204 may analyze the image data to determine the presence and/or location of one or more passengers and/or objects in the cabin 102.

In some examples, the VOM system 200 may utilize the vehicle microphone system 214 to capture audio. The vehicle microphone system 214 may include one or more microphones disposed at one or more locations in the cabin 102. The vehicle microphone system 214 may be configured to detect one or more stimuli (e.g., sound) and output audio data associated with the stimuli. Audio data includes data associated with the audio captured by the one or more microphones of the vehicle microphone system 214. The vehicle microphone system 214 may transmit audio data to the BCM 204 to be analyzed by the VOM system 200. For example, the BCM 204 may analyze the audio data to determine the presence and/or location of one or more passengers and/or objects in the cabin 102.

In some examples, the VOM system 200 may utilize the vehicle temperature system 216 to determine a temperature within the cabin 102. The vehicle temperature system 216 may include one or more thermometers disposed at one or more locations in the cabin 102. The vehicle temperature system 216 may be configured to detect an air temperature and output temperature data associated with the air temperature. The vehicle temperature system 216 may transmit temperature data to the BCM 204 to be analyzed by the VOM system 200.

In some examples, the vehicle door sensors 218 may be disposed at each of the doors 110 of the vehicle 100. The vehicle door sensors 218 may be configured to detect the opening, closing, locking, and/or unlocking of each of the respective doors 110 and/or determine a door state of one or more doors 110. Moreover, the vehicle door sensors 218 may be configured to detect or determine whether a door 110 is opened and/or closed using an exterior door handle 112 (e.g., an "outer handle") and/or an interior door handle 112 (e.g., an "inner handle"). The vehicle door sensors 218 may transmit data indicative of the door state of one or more doors 110 to the BCM 204 to be analyzed by the VOM system 200. For example, the BCM 204 may analyze the data to determine whether a door 110 is open, closed, locked, and/or unlocked, and/or whether an exterior door handle 112 or interior door handle 112 is used to open and/or close the door 110.

In some examples, the window sensors 220 may be disposed at each of the windows 120 of the vehicle 100. The window sensors 220 may be configured to detect the opening and/or closing of each of the respective windows 120 and/or determine a window state of one or more windows 120. The window sensors 220 may transmit data indicative of the window state of one or more windows 120 to the BCM 204 to be analyzed by the VOM system 200. For example, the BCM 204 may analyze the data to determine whether a window 120 is open and/or closed.

In some examples, the power control unit 222 may be configured to detect the disabling and/or enabling of an engine of the vehicle 100 and/or determine an engine state of the vehicle 100. The power control unit 222 may include a push-start button configured to move the engine state of the vehicle 100 between disabled and enabled. The power control unit 222 may transmit data indicative of the engine state of the vehicle 100 to the BCM 204 to be analyzed by the VOM system 200. For example, the BCM 204 may analyze the data to determine whether the engine of the vehicle 100 is disabled or enabled.

In some examples, the transmission control unit 224 may be configured to detect the shifting of a transmission of the vehicle 100 and/or determine a transmission state of the vehicle 100. The transmission control unit 224 may include one or more solenoids (e.g., shift solenoid, shift lock solenoid, pressure control solenoid, torque converter lockup solenoid) that move the transmission state of the vehicle 100 between park (e.g., mechanically locked), reverse (e.g., reverse motion), neutral (e.g., not applied to the wheels of the vehicle 100), and drive (e.g., forward motion). The transmission state of the vehicle 100 may be moved or changed, for example, based on sensor data and/or other data provided by the ECU 206 (e.g., engine state, transmission state, vehicle speed, wheel speed, throttle position, input speed, transmission fluid temperature, transmission fluid pressure, brake state, traction control system data, cruise control module data). The transmission control unit 224 may transmit data indicative of the transmission state of the vehicle 100 to the BCM 204 to be analyzed by the VOM system 200. For example, the BCM 204 may analyze the data to determine whether the transmission of the vehicle 100 is in park, reverse, neutral, or drive.

In some examples, the communication unit 226 may be configured to provide wireless computer communications utilizing various protocols to communicate internally with the plurality of components of the vehicle 100 and/or externally with one or more external devices, such as a portable device 230 and/or a mobile device 240 used by the operator of the vehicle 100. Generally, these protocols include a wireless system (e.g., IEEE 802.11 (Wi-Fi), IEEE 802.15.1 (Bluetooth®)), a near field communication (NFC) system (e.g., ISO 23157), a local area network (LAN), and/or a point-to-point system. The communication unit 226 may allow connection of one or more portable devices 230 and/or mobile devices 240 to the vehicle 100 to allow computer communication between components of the portable devices 230 and/or mobile devices 240 and the components of the vehicle 100.

Portable devices 230 may include a remote device such as a key fob that is pre-associated with the vehicle 100. A portable device 230 includes a processor 242 for computing, one or more input buttons 244 to provide inputs, and a communication device 246 for transmitting and/or receiving non-transitory signals. For example, the communication device 246 may be configured to transmit and receive one or more radio-frequency signals (RF signals) between the vehicle 100 and the portable device 230. In some examples, the communication device 246 may be configured to emit or transmit a unique low-frequency signal and/or device identifier data that may be used to uniquely identify the portable device 230.

The communication unit 226 of the vehicle 100 may be configured to determine if the portable device 230 is located within or outside of one or more predetermined distance thresholds of the vehicle 100 based on signals sent to and/or received from the portable device 230. For example, the BCM 204 may be configured to determine a signal strength (RSSI) value and/or a time of flight (TOF) value associated with one or more signals communicated by the portable device 230 to determine the presence of the portable device 230 within or outside of the predetermined distance threshold of the vehicle 100. Such a determination may be used by the BCM 204 to determine if the portable device 230 is located within or outside of the predetermined distance of the vehicle 100.

In some examples, the portable device 230 allows the operator to move the engine state of the vehicle 100 from disabled to enabled (e.g., start an engine of the vehicle 100) by pressing the push-start button of the power control unit 222 while the portable device 230 is within one or more predetermined distance thresholds of the vehicle 100 (e.g., inside the cabin 102). In some examples, the portable device 230 allows the operator to move a door state of one or more doors 110 between unlocked and locked by pressing an input button 244 of the portable device 230 (e.g., a "lock" input button 244 and/or an "unlock" input button 244) while the portable device 230 is within one or more predetermined distance thresholds of the vehicle 100. Additionally, one or more doors 110 may be moved from the locked state to the unlocked state when an exterior door handle 112 is used to open a door 110 while the portable device 230 is within one or more predetermined distance thresholds of the vehicle 100 (e.g., at or near the door 110).

The communication unit 226 of the vehicle 100 may be utilized to communicate data between the BCM 204 of the vehicle 100 and one or more mobile devices 240 that execute an accompanying VOM application (not shown). In some examples, the mobile devices 240 may utilize the VOM application in certain circumstances to provide the one or more alerts to the operator of the vehicle 100.

Mobile devices 240 may include, without limitation, a handheld device, a mobile device, a smart phone, a laptop, a tablet, and/or an e-reader. The mobile devices 240 may include a computing device including a processor 252 for computing, a display screen 254 (e.g., touchscreen) to present info and/or provide inputs, and a communication device 256 for transmitting and/or receiving non-transitory signals. For example, the communication device 256 may be configured to transmit and receive one or more radio-frequency signals (RF signals) between the vehicle 100 and the mobile device 240. In some examples, the communication device 256 may be configured to emit or transmit a unique low-frequency signal and/or device identifier data that may be used to uniquely identify the portable device 230.

II. Vehicle Occupant Monitoring and Associated Methods

An overview of exemplary processes of enabling vehicle occupant monitoring and providing one or more alerts associated with vehicle occupant monitoring by the VOM system 200 will now be discussed with continued reference to FIG. 1 and FIG. 2. For example, the BCM 204 may notify the operator of the vehicle 100 to check the vehicle 100 for one or more passengers when there is a possibility of a presence of one or more passengers and/or objects in the cabin 102 based on instructions that are provided to one or more components of the vehicle 100 through the ECU 206.

In some examples, the BCM 204 and/or ECU 206 may execute instructions to communicate with one or more of the components of the VOM system 200 and/or cause a function or action via one or more components of the VOM system 200. The BCM 204 and/or ECU 206 may include logic, a software controlled microprocessor, and a memory device containing executing instructions that may be utilized to store data (e.g., at the storage unit 210).

In some examples, the BCM 204 may store or retrieve a time stamp associated with data pertaining to the presence of one or more passengers and/or objects (e.g., portable device 230) in the cabin 102; data pertaining to the opening, closure, locking, and/or unlocking of one or more doors 110; data pertaining to the engine state of the vehicle 100, and/or data pertaining to the transmission state of the vehicle 100. The time stamp may be accessed and analyzed against one or more other time stamps to provide functions of the VOM system 200. In some examples, the BCM 204 may generate the time stamps using a system clock that may be executed by the ECU 206.

In some examples, the VOM system 200 may be activated based on a state of one or more doors 110 of the vehicle 100. For example, when the vehicle door sensors 218 detect that an exterior door handle 112 is used to open a door 110, the vehicle door sensors 218 may transmit one or more signals to the BCM 204. In some examples, the BCM 204 may transmit the at least one type of alert based on a time that the interior door handle 112 is used to close the door 110. The at least one type of alert may be transmitted, for example, when the time that the interior door handle 112 is used to close the door 110 satisfies a predetermined threshold. For another example, the at least one type of alert may be transmitted when a door 110 has been in an open state for a predetermined duration. In some examples, the BCM 204 may determine or identify the time that a door handle 112 was used to open the door 110 by communicating with the vehicle door sensors 218 and/or storage unit 210. Upon determining that the door handle 112 is used to open a door 110 and/or a door 110 has been in the open state for at least the predetermined duration, the VOM system 200 may determine whether to provide at least one type of alert to the mobile device 240 associated with the vehicle 100.

In some examples, the VOM system 200 may provide at least one type of alert to the mobile device 240 based on a key fob state of the vehicle 100. The communication unit 226 may transmit the at least one type of alert to the mobile device 240, for example, if the key fob state of the vehicle 100 is undetected when the door 110 is closed. The communication unit 226 may transmit the another type of alert to the mobile device 240 if the key fob state of the vehicle 100 is undetected while the door 110 is open. In some examples, the key fob state of the vehicle 100 may be undetected when the portable device 230 is located outside of a predetermined distance of the vehicle 100. The portable device 230 may be determined to be located outside of the predetermined distance, for example, if no signal from a portable device 230 is detected, if the signal strength value of a detected signal is below a predetermined signal strength threshold, and/or if the time of flight value of the detected signal exceeds a predetermined time of flight threshold. The BCM 204 may be configured to evaluate a signal and determine a RSSI value and/or a TOF value associated with the signal, and evaluate the RSSI value and/or TOF value against one or more RSSI value thresholds and/or one or more TOF value thresholds to determine whether the portable device 230 is within or outside of the predetermined distance threshold of the vehicle 100.

In some examples, the BCM 204 may communicate with the communication unit 226 to determine the key fob state of the vehicle 100. To determine the key fob state of the vehicle 100, the communication unit 226 may transmit one or more signals to the portable device 230 and/or scan for a unique low-frequency signal or device identifier data associated with the portable device 230. Additionally or alternatively, the BCM 204 may communicate with the storage unit 210 to retrieve a time stamp associated with the latest key fob state and/or the latest detected signal from a portable device 230, and determine the key fob state based on the time stamp. In some examples, the communication unit 226 transmit the at least one type of alert if a duration of the key fob state of the vehicle 100 satisfies a predetermined threshold.

In some examples, the VOM system 200 may provide at least one type of alert to the mobile device 240 based on an engine state of the vehicle 100. In some examples, the BCM 204 may communicate with the power control unit 222 to determine the engine state of the vehicle 100. Additionally or alternatively, the BCM 204 may communicate with the storage unit 210 to retrieve a time stamp associated with the latest engine state, and determine the engine state of the vehicle 100 based on the time stamp. In some examples, the communication unit 226 transmit the at least one type of alert if a duration of the engine state satisfies a predetermined threshold.

In some examples, the VOM system 200 may provide at least one type of alert to the mobile device 240 based on a transmission state of the vehicle 100. In some examples, the BCM 204 may communicate with the transmission control unit 224 to determine the transmission state of the vehicle 100. Additionally or alternatively, the BCM 204 may communicate with the storage unit 210 to retrieve a time stamp associated with the latest transmission state, and determine the transmission state of the vehicle 100 based on the time stamp. In some examples, the communication unit 226 transmit the at least one type of alert if a duration of the transmission state satisfies a predetermined threshold.

In some examples, the BCM 204 determines the presence and/or location of one or more passengers and/or objects in the cabin 102. The BCM 204 may activate and utilize a vehicle sensor system (e.g., vehicle camera system 212, vehicle microphone system 214), for example, to detect one or more parameters of the cabin 102. The BCM 204 may communicate with the vehicle camera system 212 and/or the vehicle microphone system 214 to capture images and/or audio and provide respective data to the BCM 204.

Based on the image data and/or audio data, the BCM 204 may determine if there is a presence of one or more passengers and/or objects in the cabin 102. The BCM 204 may analyze image data and/or audio data using logic to determine whether at least one passenger is located within the cabin 102. In some examples, the images captured from within the cabin 102 may be within one or more predetermined size, shape, and texture thresholds that may be associated with the presence of one or more passengers. For example, the one or more predetermined size, shape, and texture thresholds may be associated with the size, shape, and texture of one or more images that may pertain to the movement, size, shape, and/or location of the one or more passengers in the cabin 102 that is distinguishable from parts of the vehicle 100 (e.g., seats, etc.). In some examples, the audio captured from within the cabin 102 may be within one or more predetermined pitch and frequency thresholds that may be associated with the presence of one or more passengers. For example, the one or more predetermined pitch and frequency thresholds may be associated with the pitch and frequency of one or more sounds that may pertain to the movement, voice/sounds (e.g. voice of a child), and/or location of the one or more passengers in the cabin 102 that is distinguishable from ambient noise of the vehicle 100.

If the presence of one or more passengers and/or objects is detected in the cabin 102, the BCM 204 may access the storage unit 210 and store a detection flag that includes one or more indications of the passengers and/or objects in the cabin 102. The detection flag may include data that pertains to the determined presence and location of the passengers and/or objects in the cabin 102. If the BCM 204 does not detect the presence of one or more passengers and/or objects in the cabin 102 based on the analysis of the image data and/or audio data, a non-detection flag may be stored in the storage unit 210. If a passenger is located within the cabin 102, the at least one type of alert may be generated to include a warning notification regarding the passenger located within the cabin 102.

The BCM 204 may employ the communication unit 226 to communicate the at least one alert to the mobile device 240. In some examples, the mobile device 240 includes a VOM application that is executed on the mobile device 240 to analyze data received from the communication unit 226 and present a vehicle occupant interface 302 (shown in FIG. 3) via the display screen 254 of the mobile device 240.

The display screen 254 may present one or more types of alerts that may include one or more types of interface layouts and configurations that are presented as part of the vehicle occupant interface 302. In some examples, the VOM system 200 may present a video/image feed overlaid with one or more highlighted locations 304 (shown in FIG. 3) at one or more locations in the cabin 102 where the presence of one or more passengers are detected (e.g., as stored in the detection indication data flag) by the BCM 204. The video/image feed may also be overlaid with one or more user interface notifications 306. Such user interface notifications 306 (shown in FIG. 3) may be presented based on the determination of passengers (e.g., as opposed to objects) in the cabin 102. In some examples, a dismiss user interface input button 308 (shown in FIG. 3) may be presented to the operator to allow the operator to dismiss the user interface notifications 306 and deactivate the presentation of the vehicle occupant interface 302.

In some examples, the VOM system 200 may provide at least one type of alert to the mobile device 240 based on a time that a previous alert was transmitted (e.g., the time that an alert was last communicated). The communication unit 226 may transmit the at least one type of alert to the mobile device 240, for example, if the time that the previous alert was transmitted satisfies a predetermined threshold (e.g., more than five minutes ago). In some examples, the BCM 204 may communicate with the communication unit 226 to determine when a previous alert was transmitted. Additionally or alternatively, the BCM 204 may communicate with the storage unit 210 to retrieve a time stamp associated with the time that the previous alert was transmitted, and determine when the previous alert was transmitted based on the time stamp.

In some examples, the BCM 204 may communicate with the head unit 208 to actuate one or more doors 110 and/or windows 120. For example, a door 110 may be unlocked and/or opened to allow the passenger to exit or leave the vehicle 100. For another example, a window 120 may be opened to facilitate reducing an air temperature within the cabin 102. In some examples, the BCM 204 may communicate with the head unit 208 to employ one or more lights (e.g., headlights), one or more speakers, and/or a horn of the vehicle 100 to bring attention as to the existence of the passengers/objects in the cabin 102. For example, the lights and/or horn may be actuated to provide repeated flashing, buzzes/chimes, and/or honks/beeps, respectively.

Figure 4:
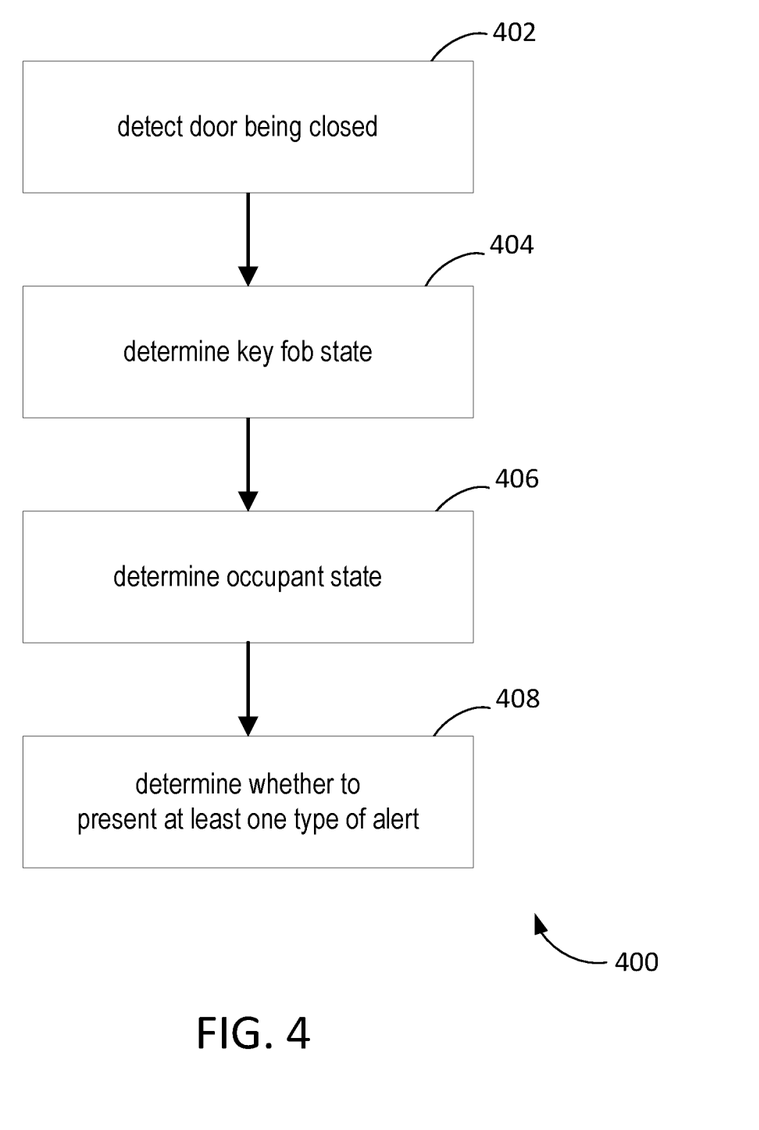
FIG. 4 is an illustrative process flow diagram of a method executed by the VOM system to provide one or more types of alerts according to some examples of the present disclosure.
Figure 5:
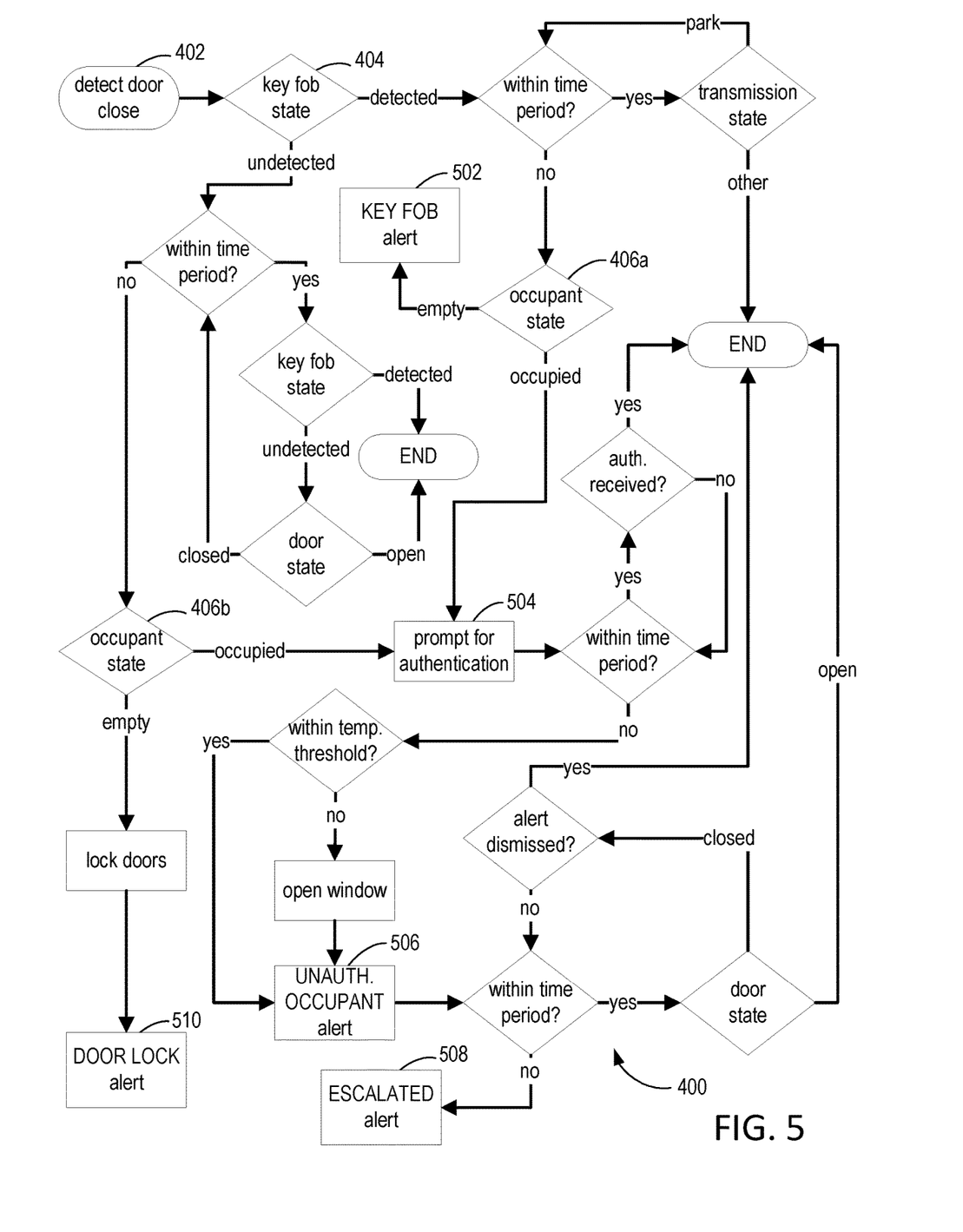
FIG. 5 is a detailed process flow diagram of a method executed by the VOM system, such as the method shown in FIG. 4.
Figure 6:
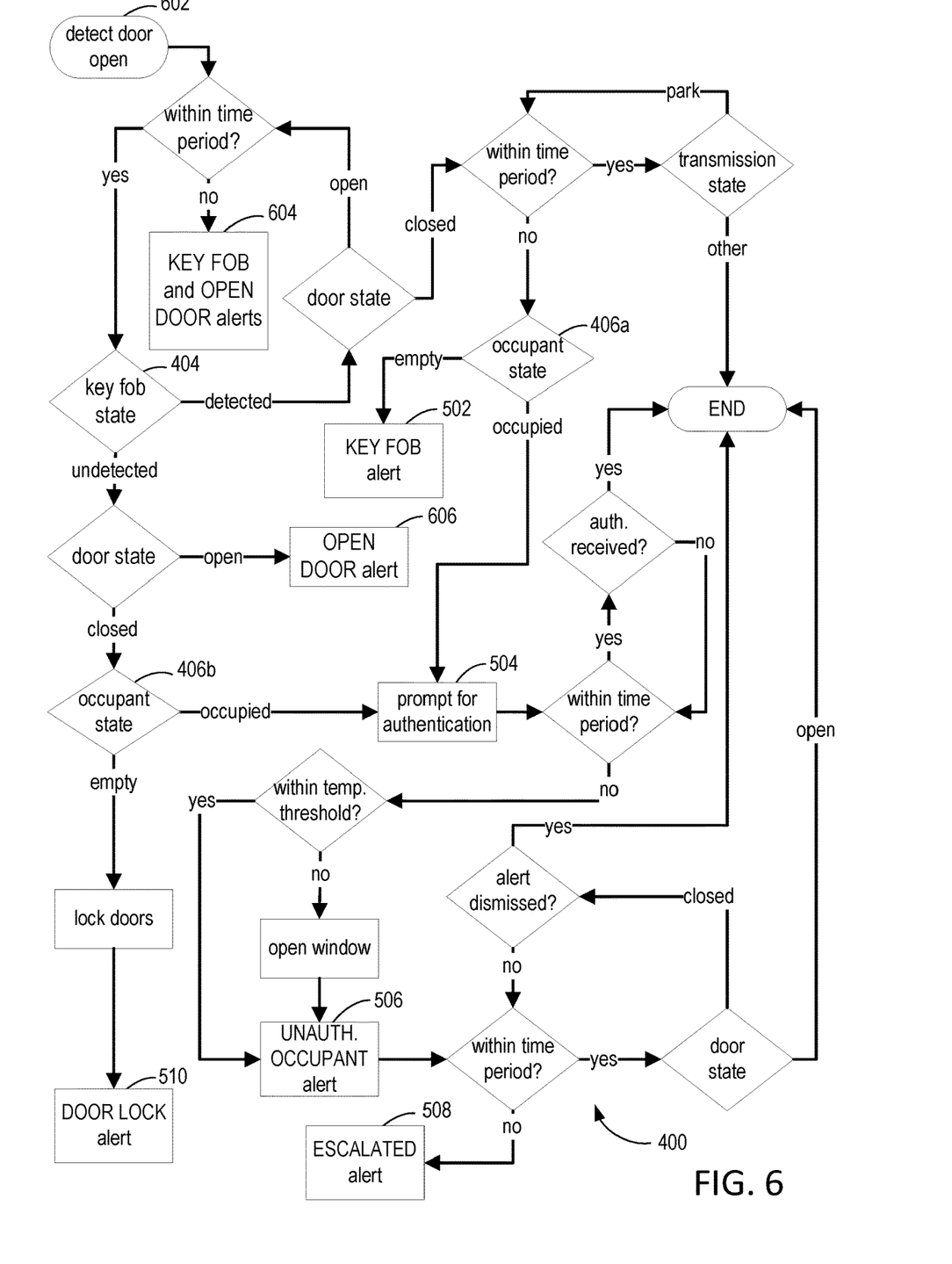
FIG. 6 is another detailed process flow diagram of a method executed by the VOM system, such as the method shown in FIG. 4.

FIGS. 4-6 show various operations of a method 400 executed by the VOM system 200 to determine whether to transmit at least one type of alert to a mobile device 240 associated with the vehicle 100. The method 400 of FIGS. 4-6 will be described with reference to the components of FIG. 1 and FIG. 2, though it is to be appreciated that the method 400 may be used with other systems and/or components. The method 400 may include, for example, detecting a door 110 of the vehicle 100 being closed at operation 402, determining a key fob state of the vehicle 100 at operation 404, and determining an occupant state of the vehicle 100 at operation 406. In some examples, the key fob state and/or occupant state are determined on condition that the door 110 is closed from an interior of the vehicle 100 (e.g., an interior door handle 112 was used to close the door 110). The method 400 may include determining whether to present at least one type of alert based on the key fob state and the occupant state at operation 408.

As shown in FIG. 5, in some examples, the method 400 may begin at operation 402, when the doors 110 of the vehicle 100 are closed. In some examples, the vehicle door sensors 218 may monitor the doors 110 of the vehicle 100 to determine when one or more of the doors 110 of the vehicle 100 are changed between an open state and a closed state, and transmit door state data to the BCM 204 with each change. For example, upon determining that one or more of the doors 110 are changed from the open state to the closed state, the vehicle door sensors 218 may communicate door state data indicating a time of the closure of the one or more doors 110 of the vehicle 100. Conversely, upon determining that one or more of the doors 110 are changed from the closed state to the open state, the vehicle door sensors 218 may communicate door state data indicating a time of the opening of the one or more doors 110 of the vehicle 100. In some examples, the BCM 204 may determine that an interior door handle 112 was used to open or close the door 110. For example, the BCM 204 may assign a higher confidence of an occupant being in the cabin 102 if an interior door handle 112 was used to close a door 110 than if an exterior door handle 112 was used to close the door 110.

Upon determining that the doors 110 are closed, the BCM 204 may communicate with a key fob sensor (e.g., at the communication unit 226) to determine a key fob state of the vehicle 100 at operation 404. The communication unit 226 may provide an indication that the key fob state of the vehicle 100 is detected when the portable device 230 is located within the predetermined distance threshold of the vehicle 100. In some examples, the method 400 may terminate or end when the operator is determined to be within the cabin 102 with the portable device 230. For example, as shown in FIG. 5, the method 400 may end when the transmission state is moved from park (e.g., to reverse or drive) within a first predetermined time period. Alternatively, the operator may be determined to be within the cabin 102 based on any combination of factors that enables the VOM system 200 to function as described herein.

If the operator is not determined to be within the cabin 102 within the first predetermined time period (e.g., the transmission state remains in park), the BCM 204 may scan the cabin 102 to determine an occupant state of the vehicle 100 at operation 406a. In some examples, the BCM 204 may communicate with a vehicle sensor system (e.g., vehicle camera system 212, vehicle microphone system 214) to determine the occupant state of the vehicle 100. The vehicle camera system 212 and/or vehicle microphone system 214 may provide an indication that the occupant state of the vehicle 100 is empty (e.g., a non-detection flag) when no occupants are detected in the cabin 102. In some examples, the BCM 204 determines, based on the non-detection flag, to present a key fob alert at operation 502 notifying the operator that the portable device 230 is located within the predetermined distance threshold of the vehicle 100. In this manner, the operator may be notified when the portable device 230 has been left inside the cabin 102.

If one or more occupants are detected in the cabin 102, the vehicle camera system 212 and/or vehicle microphone system 214 may provide an indication that the occupant state of the vehicle 100 is occupied (e.g., a detection flag). In some examples, the method 400 may terminate or end when one or more occupants are determined to be allowed or authorized to be in the cabin 102. For example, as shown in FIG. 5, the method 400 may end when user authentication is received within a second predetermined time period. In some examples, the BCM 204 may prompt the detected occupants for user authentication at operation 504 (e.g., to verify that the occupants are allowed or authorized to be in the cabin 102). The occupants may be authenticated, for example, by pressing one or more buttons within the cabin 102 in a predetermined order and/or by starting the vehicle 100 and moving the transmission state from park (e.g., to reverse or drive). For example, the electric parking brake switch may be moved in a predetermined pattern (e.g., up, then up and hold for 2 seconds) to authenticate the occupants. In some examples, the BCM 204 may prompt the operator for user authentication at operation 504 using one or more portable devices 230 and/or mobile devices 240 associated with the vehicle 100. For example, one or more buttons on a portable device 230 associated with the vehicle 100 may be pressed in a predetermined pattern (e.g., lock, then lock and hold for 2 seconds) to authenticate the occupants. For another example, a password or other form of authentication (e.g., fingerprint, face recognition) may be entered into a mobile device 240 associated with the vehicle 100 to authenticate the occupants. In this manner, one or more operators may remotely confirm that one or more occupants are allowed or authorized to be in the cabin 102. Alternatively, the detected occupants may be authenticated based on any combination of factors that enables the VOM system 200 to function as described herein.

Figure 3:
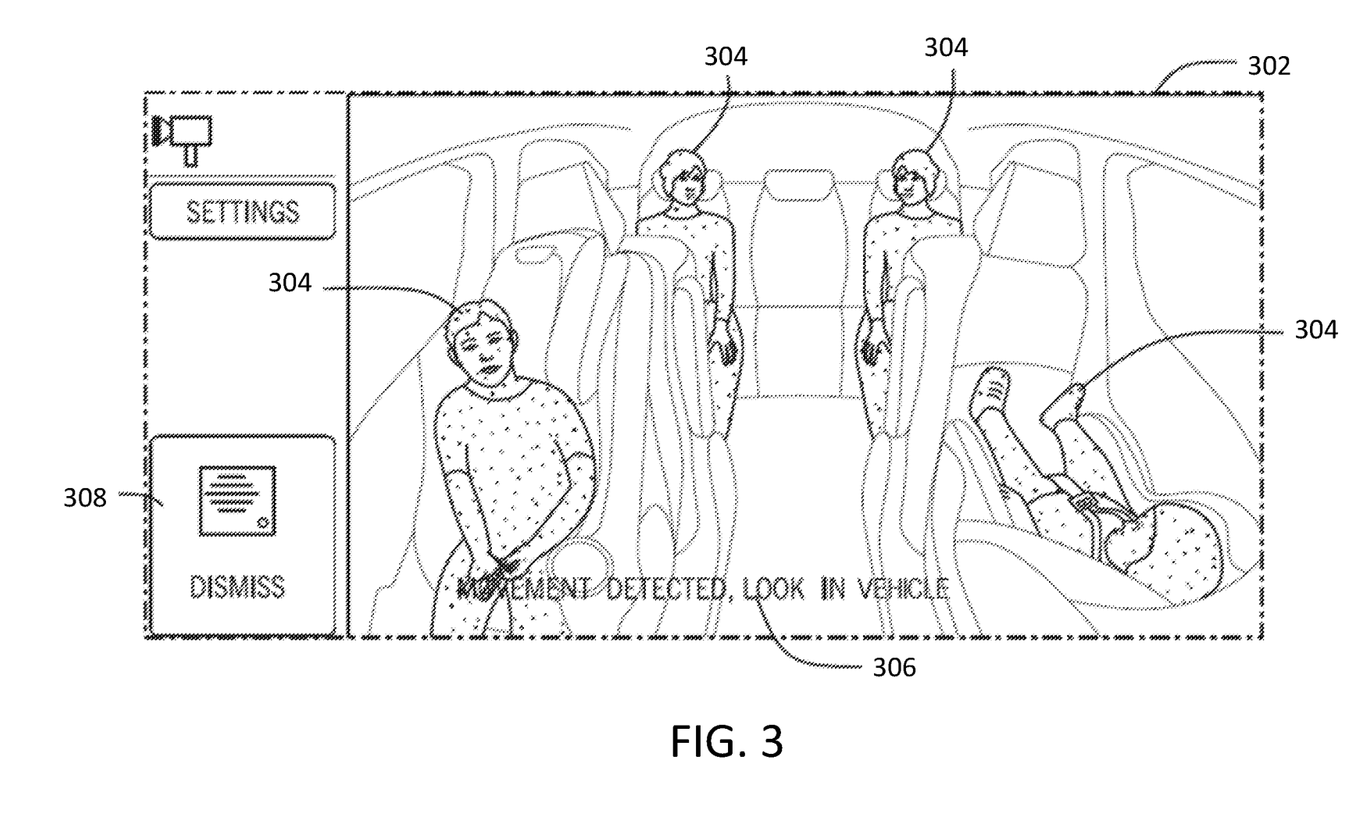
FIG. 3 is an illustrative example of a vehicle occupant interface of the VOM system presented on a display screen according to some examples of the present disclosure.

In some examples, the BCM 204 may employ the communication unit 226 to communicate the prompt for user authentication to the mobile device 240 using a VOM application executed on the mobile device 240. For example, the VOM application may analyze the data received from the communication unit 226 and present the vehicle occupant interface 302 via a display screen 254 of the mobile device 240. In some examples, the vehicle occupant interface 302 may be presented with an image/video feed of the cabin 102, which may be overlaid with one or more highlighted locations 304, user interface notifications 306, and/or a dismiss user interface input button 308. The BCM 204 may communicate data to the VOM application based on communication between the communication unit 226 and the communication device 256. The communicated data may include one or more commands to initiate a video/audio/vibratory alert via the display screen 254/speaker(s), and/or motor(s), respectively, of the mobile device 240.

If the occupants are not authenticated within the second predetermined time period (e.g., user authentication is not received), the BCM 204 may determine to present an unauthorized occupant alert at operation 506 notifying the operator that one or more unauthorized occupants are located inside the cabin 102. In this manner, the operator may be notified when one or more children are inside the cabin 102. In some examples, the BCM 204 may communicate with the vehicle camera system 212, vehicle microphone system 214, and/or vehicle temperature system 216 to determine whether one or more occupants are exposed or susceptible to heatstroke and/or other medical condition, and communicate with the head unit 208 to facilitate controlling the cabin environment accordingly. For example, as shown in FIG. 5, the method 400 may include opening one or more windows 120 if the cabin temperature exceeds a predetermined threshold. Alternatively, the BCM 204 may communicate with the head unit 208 to start the vehicle 100 and utilize the air conditioning and/or heater system to facilitate regulating the cabin temperature and/or body temperature of one or more occupants.

In some examples, the method 400 may terminate or end when the unauthorized occupant alert is determined to be attended or acknowledged. For example, as shown in FIG. 5, the method 400 may end when one or more doors 110 are opened (e.g., using an exterior door handle 112) and/or the unauthorized alert is dismissed within a third predetermined time period. Additionally or alternatively, the method 400 may end when the key fob state is detected, the engine state is enabled, the transmission state is moved away from park, and/or the occupant state is empty.

In some examples, the vehicle occupant interface 302 may provide the unauthorized occupant alert on the mobile device 240 for a predetermined number of times at predetermined durations until the BCM 204 determines that the dismiss user interface input button 308 is used or the method 400 is otherwise terminated. The dismiss user interface input button 308 may be presented to allow the operator to dismiss the user interface notifications 306 and/or deactivate the presentation of the vehicle occupant interface 302. If the dismiss user interface input button 308 is used, the mobile device 240 may utilize the communication device 256 to communicate respective data associated with the input to the BCM 204 via the communication unit 226. In some examples, the BCM 204 may acknowledge that the dismiss user interface input button 308 was used based on the receipt of the respective data associated with the input from the mobile device 240.

If the unauthorized occupant alert is not attended or acknowledged within the third predetermined time period, the BCM 204 may determine to present an escalated alert at operation 508 notifying one or more third parties that one or more unauthorized occupants (e.g., children) are located inside the cabin 102. In some examples, the BCM 204 may communicate with an emergency services system for summoning emergency services. Additionally or alternatively, the BCM 204 may communicate with the head unit 208 to employ one or more lights (e.g., headlights), one or more speakers, and/or a horn of the vehicle 100 to bring attention as to the existence of the one or more unauthorized occupants in the cabin 102. For example, the lights and/or horn may be actuated to provide repeated flashing, buzzes/chimes, and/or honks/beeps, respectively.

If, upon detecting the door 110 being closed at operation 402, the BCM 204 determines at operation 404 that the key fob state of the vehicle 100 is undetected (e.g., the portable device 230 is determined to be located outside of the predetermined distance threshold of the vehicle 100), the method 400 may terminate or end when one or more occupants are determined to be leaving the cabin 102 or one or more occupants-to-be are determined to be entering the cabin 102. For example, as shown in FIG. 5, the method 400 may end when the door state changes from closed to open within a fourth predetermined time period. That said, one of ordinary skill in the art would understand that the method 400 would start (again) upon detecting the door 110 being closed at operation 402.

Additionally or alternatively, the method 400 may terminate or end when the operator is determined to be at or adjacent to the vehicle 100. For example, as shown in FIG. 5, the method 400 may end when the key fob state changes from undetected to detected within the fourth predetermined time period. Alternatively, the operator may be determined to be at or adjacent to the vehicle 100 based on any combination of factors that enables the VOM system 200 to function as described herein.

In some examples, the communication unit 226 may monitor the vehicle 100 to determine when the key fob state of the vehicle 100 is changed between an undetected state and a detected state, and transmit key fob state data to the BCM 204 with each change. For example, upon determining that the key fob state of the vehicle 100 is changed from the undetected state to the detected state, the communication unit 226 may communicate key fob state data indicating a time of the detection of the portable device 230. Conversely, upon determining that the key fob state of the vehicle 100 is changed from the detected state to the undetected state, the communication unit 226 may communicate key fob state data indicating a time of the non-detection of the portable device 230. As an illustrative example, if the operator exits the vehicle 100 and walks away from the vehicle 100 as he/she carries the portable devices 230, the portable device 230 may be carried outside of the predetermined distance of the vehicle 100. Upon the portable device 230 being carried outside the predetermined distance of the vehicle 100, the BCM 204 may determine that the portable device 230 is outside of the predetermined distance of the vehicle 100 based on the comparison of RSSI value(s) and/or TOF value(s) against the RSSI value threshold(s) and/or the TOF value threshold(s). Conversely, if the operator approaches the vehicle 100 as he/she carries the portable devices 230, the portable device 230 may be carried within the predetermined distance of the vehicle 100. Upon the portable device 230 being carried inside the predetermined distance of the vehicle 100, the BCM 204 may determine that the portable device 230 is within the predetermined distance of the vehicle 100 based on the comparison of RSSI value(s) and/or TOF value(s) against the RSSI value threshold(s) and/or the TOF value threshold(s).

If one or more occupants are not determined to be leaving the cabin 102, one or more occupants-to-be are not determined to be entering the cabin 102, or the operator is not determined to be at or adjacent to the vehicle 100 within the fourth predetermined time period (e.g., the door state remains closed and the key fob state remains undetected), the BCM 204 may scan the cabin 102 to determine an occupant state of the vehicle 100 at operation 406b. In some examples, the BCM 204 may communicate with the vehicle sensor system (e.g., vehicle camera system 212, vehicle microphone system 214) to determine the occupant state of the vehicle 100. The vehicle camera system 212 and/or vehicle microphone system 214 may provide an indication that the occupant state of the vehicle 100 is empty (e.g., a non-detection flag) when no occupants are detected in the cabin 102. In some examples, the BCM 204 determines, based on the non-detection flag, to communicate with the head unit 208 to lock the doors 110 and present a door lock alert at operation 510 notifying the operator that the doors 110 have been locked. In this manner, the doors 110 may be locked when there are no occupants and the operator may be notified as such. If one or more occupants are detected in the cabin 102, the method 400 may prompt the occupants and/or operator for user authentication at operation 504 (e.g., to verify that the occupants are allowed or authorized to be in the cabin 102) and continue as described above.

As shown in FIG. 6, in some examples, the method 400 may begin at operation 602, when one or more doors 110 of the vehicle 100 are open. In some examples, the BCM 204 may communicate with the key fob sensor (e.g., at the communication unit 226) to determine the key fob state of the vehicle 100 at operation 404. If the key fob state of the vehicle 100 remains detected for a fifth predetermined time period while the doors 110 are open, the BCM 204 may determine to present a key fob alert and/or an open door alert at operation 604 notifying the operator that the portable device 230 is located within the predetermined distance threshold of the vehicle 100 and/or that one or more doors 110 are open. In this manner, the operator may be notified when the portable device 230 has been left inside the cabin 102 and/or the doors 110 have been left open. In some examples, the fifth predetermined time period is increased each time the door sensors 218 detect one or more doors 110 being opened.

If the door sensors 218 detect that the doors 110 have closed within a first predetermined time period (e.g., the door state has moved to closed) while the portable device 230 is within the predetermined distance of the vehicle 100, the method 400 may terminate or end when the operator is determined to be within the cabin 102. For example, as shown in FIG. 6, the method 400 may end when the transmission state is moved from park (e.g., to reverse or drive) within the first predetermined time period. On the other hand, if the operator is not determined to be within the cabin 102 (e.g., the transmission state remains in park), the BCM 204 may scan the cabin 102 to determine an occupant state of the vehicle 100 at operation 406a. As shown in FIG. 6, the BCM 204 may determine to present a key fob alert at operation 502 if the occupant state is empty. If one or more occupants are detected in the cabin 102, the method 400 may prompt the occupants and/or operator for user authentication at operation 504 (e.g., to verify that the occupants are allowed or authorized to be in the cabin 102), and continue as described above in regard to FIG. 5.

If the portable device 230 is outside of the predetermined distance of the vehicle 100 (e.g., the key fob state moves to undetected) while the doors 110 are open, the BCM 204 may determine to present an open door alert at operation 606 notifying the operator that one or more doors 110 are open. On the other hand, if the door sensors 218 detect that the doors 110 have closed after the key fob state has been determined to be undetected, the BCM 204 may scan the cabin 102 to determine an occupant state of the vehicle 100 at operation 406b. As shown in FIG. 6, the BCM 204 may determine to communicate with the head unit 208 to lock the doors 110 and present a door lock alert at operation 510 if the occupant state is empty. If one or more occupants are detected in the cabin 102, the method 400 may prompt the occupants and/or operator for user authentication at operation 504 (e.g., to verify that the occupants are allowed or authorized to be in the cabin 102), and continue as described above in regard to FIG. 5.

Children may enter a vehicle without authorization. Examples described herein enable vehicle access to be remotely monitored. For example, one or more users (e.g., owners, operators, adults) may be notified when one or more unauthorized users (e.g., children) have gained unauthorized entry into a vehicle. It should be apparent from the foregoing description that various examples may be implemented in hardware. Furthermore, various examples may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

When introducing elements, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for remotely monitoring access of a vehicle, comprising:
    detecting a door of the vehicle being closed;
    upon detecting the door being closed, determining a key fob state of the vehicle and an occupant state of the vehicle; and
    on condition that the key fob state is detected and the occupant state is unauthorized:
        generating a key fob alert to notify a user that a portable device is located within a predetermined threshold of the vehicle,
        transmitting the key fob alert to a mobile device associated with the vehicle,
        detecting an engine of the vehicle being enabled, and
        on condition that the engine of the vehicle is enabled while the occupant state is unauthorized, generating an engine alert to notify the user that the engine of the vehicle is enabled, and transmitting the engine alert to the mobile device associated with the vehicle.

2. The computer-implemented method of claim 1, wherein the key fob state and the occupant state are determined on condition that the door is closed from an interior of the vehicle.

3. The computer-implemented method of claim 1, wherein determining the key fob state and the occupant state further comprises:
    activating a vehicle sensor system to detect one or more parameters of an interior cabin space of the vehicle;
    determining whether at least one occupant is located within the interior cabin space of the vehicle based on the one or more parameters; and
    on condition that the at least one occupant is located within the interior cabin space of the vehicle, determining whether the at least one occupant is authorized to be located within the interior cabin space of the vehicle; and
    wherein generating the key fob alert further comprises generating the key fob alert such that the key fob alert includes a warning notification regarding the at least one occupant located within the interior cabin space of the vehicle.

4. The computer-implemented method of claim 1, further comprising prompting an occupant of the vehicle for user authentication on condition that the key fob state is undetected and the occupant state is unauthorized.

5. The computer-implemented method of claim 1, further comprising prompting a user of the mobile device associated with the vehicle for user authentication on condition that the key fob state is undetected and the occupant state is unauthorized.

6. The computer-implemented method of claim 1, further comprising:
    on condition that the key fob state is undetected and the occupant state is unauthorized, determining whether a cabin temperature of the vehicle exceeds a predetermined threshold; and
    on condition that the cabin temperature of the vehicle exceeds the predetermined threshold while the occupant state is unauthorized, opening one or more windows of the vehicle.

7. The computer-implemented method of claim 1, further comprising locking the door on condition that the key fob state is undetected and the occupant state is unoccupied.

8. The computer-implemented method of claim 1, further comprising, on condition that the key fob state is detected and the occupant state is unauthorized:
    determining whether the occupant state has been unauthorized for at least a predetermined duration; and
    on condition that the occupant state has been unauthorized for at least the predetermined duration, generating an occupant alert to notify the user that an unauthorized occupant has been in an interior cabin space of the vehicle, and transmitting the occupant alert to the mobile device associated with the vehicle.

9. The computer-implemented method of claim 1, further comprising, on condition that the engine state is enabled while the occupant state is unauthorized:
    detecting a transmission state of the vehicle being moved from park; and
    on condition that the transmission state of the vehicle is moved from park while the occupant state is unauthorized, generating a transmission alert to notify the user that the transmission state of the vehicle is not in park, and transmitting the transmission alert to the mobile device associated with the vehicle.

10. A vehicle occupant monitor system comprising:
    a plurality of sensors comprising a door sensor, a key fob sensor, and an occupant sensor;
    a processor; and
    a memory storing instructions that, when executed by the processor, cause the processor to:
        detect a door signal associated with the door sensor, the door signal indicative of a door of a vehicle being closed;

upon detecting the door signal, communicate with the key fob sensor to determine a key fob state of the vehicle, and communicate with the occupant sensor to determine an occupant state of the vehicle; and on condition that the key fob state is detected and the occupant state is unauthorized:
generate a key fob alert to notify a user that a portable device is located within a predetermined threshold of the vehicle,
transmit the key fob alert to a mobile device associated with the vehicle,
detect an engine of the vehicle being enabled; and
on condition that the engine of the vehicle is enabled while the occupant state is unauthorized, generate an engine alert to notify the user that the engine of the vehicle is enabled, and transmit the engine alert to the mobile device associated with the vehicle.

11. The vehicle occupant monitor system of claim 10, wherein the memory stores further instructions that, when executed by the processor, cause the processor to determine the key fob state and the occupant state on condition that the door is closed from an interior of the vehicle.

12. The vehicle occupant monitor system of claim 10, wherein the memory stores further instructions that, when executed by the processor, cause the processor to:
activate a vehicle sensor system to detect one or more parameters of an interior cabin space of the vehicle;
determine whether at least one occupant is located within the interior cabin space of the vehicle based on the one or more parameters;
on condition that the at least one occupant is located within the interior cabin space of the vehicle, determine whether the at least one occupant is authorized to be located within the interior cabin space of the vehicle; and
generate the key fob alert such that the key fob alert includes a warning notification regarding the at least one occupant located within the interior cabin space of the vehicle.

13. The vehicle occupant monitor system of claim 10, wherein the memory stores further instructions that, when executed by the processor, cause the processor to prompt an occupant the vehicle for user authentication on condition that the key fob state is undetected and the occupant state is unauthorized.

14. The vehicle occupant monitor system of claim 10, wherein the memory stores further instructions that, when executed by the processor, cause the processor to prompt a user of the mobile device associated with the vehicle for user authentication on condition that the key fob state is undetected and the occupant state is unauthorized.

15. The vehicle occupant monitor system of claim 10, wherein the memory stores further instructions that, when executed by the processor, cause the processor to:
on condition that the key fob state is undetected and the occupant state is unauthorized, determine whether a cabin temperature of the vehicle exceeds a predetermined threshold; and
on condition that the cabin temperature of the vehicle exceeds the predetermined threshold while the occupant state is unauthorized, open one or more windows of the vehicle.

16. A non-transitory computer readable storage medium storing instructions that, when executed by a computer, cause the computer to:
detect a door of a vehicle being closed;
upon detecting the door being closed, determine a key fob state of the vehicle and an occupant state of the vehicle; and
on condition that the key fob state is detected and the occupant state is unauthorized:
generate a key fob alert to notify a user that a portable device is located within a predetermined threshold of the vehicle,
transmit the key fob alert to a mobile device associated with the vehicle,
detect an engine of the vehicle being enabled, and
on condition that the engine of the vehicle is enabled while the occupant state is unauthorized, generate an engine alert to notify the user that the engine of the vehicle is enabled, and transmit the engine alert to the mobile device associated with the vehicle.

17. The non-transitory computer readable storage medium of claim 16 storing further instructions that, when executed by the computer, cause the computer to:
activate a vehicle sensor system to detect one or more parameters of an interior cabin space of the vehicle;
determine whether at least one occupant is located within the interior cabin space of the vehicle based on the one or more parameters;
on condition that the at least one occupant is located within the interior cabin space of the vehicle, determine whether the at least one occupant is authorized to be located within the interior cabin space of the vehicle; and
generate the key fob alert such that the key fob alert includes a warning notification regarding the at least one occupant located within the interior cabin space of the vehicle.

18. The non-transitory computer readable storage medium of claim 16 storing further instructions that, when executed by the computer, cause the computer to prompt an occupant of the vehicle for user authentication on condition that the key fob state is undetected and the occupant state is unauthorized.

19. The non-transitory computer readable storage medium of claim 16 storing further instructions that, when executed by the computer, cause the computer to prompt a user of the mobile device associated with the vehicle for user authentication on condition that the key fob state is undetected and the occupant state is unauthorized.

20. The non-transitory computer readable storage medium of claim 16 storing further instructions that, when executed by the computer, cause the computer to:
on condition that the key fob state is undetected and the occupant state is unauthorized, determine whether a cabin temperature of the vehicle exceeds a predetermined threshold; and
on condition that the cabin temperature of the vehicle exceeds the predetermined threshold while the occupant state is unauthorized, open one or more windows of the vehicle.

\* \* \* \* \*